United States Patent [19]
Wade et al.

[11] 3,795,131
[45] Mar. 5, 1974

[54] SPIN TESTING APPARATUS FOR TURBINE-TYPE FLOW METERS

[75] Inventors: Zane A. Wade; William F. Kolash, both of Du Bois, Pa.

[73] Assignee: Rockwell Manufacturing Company, Pittsburgh, Pa.

[22] Filed: Mar. 17, 1971

[21] Appl. No.: 125,178

[52] U.S. Cl. .............................................. 73/3, 73/9
[51] Int. Cl. ...................... G01f 25/00, G01m 19/00
[58] Field of Search ...................... 73/3, 9; 324/162

[56] References Cited
UNITED STATES PATENTS
| | | | |
|---|---|---|---|
| 3,116,628 | 1/1964 | Gordon | 73/9 |
| 2,937,518 | 5/1960 | Bjong | 73/9 |
| 2,645,755 | 5/1953 | Garfield | 324/162 |

*Primary Examiner*—S. Clement Swisher

[57] ABSTRACT

An apparatus for measuring a performance-indicating parameter in a fluid flow turbine meter spin test in which the turbine meter rotor and other operative rotatable parts of the turbine meter are selectively accelerated and then allowed to coast so that the rate of the rotor rotational speed is dependent upon accuracy-impairing mechanical friction which resists rotation of the turbine meter rotor. The measured performance-indicating parameter is comparable with a reference parameter to determine if an increase has occurred in the mechanical friction which is developed by the operative meter parts under test. The measured performance indicating parameter may be the time required by the coasting turbine meter rotor to decay from one pre-selected speed to a lower pre-selected speed, or it may be the change in decaying rotor speed that occurs in a pre-selected time period.

21 Claims, 4 Drawing Figures

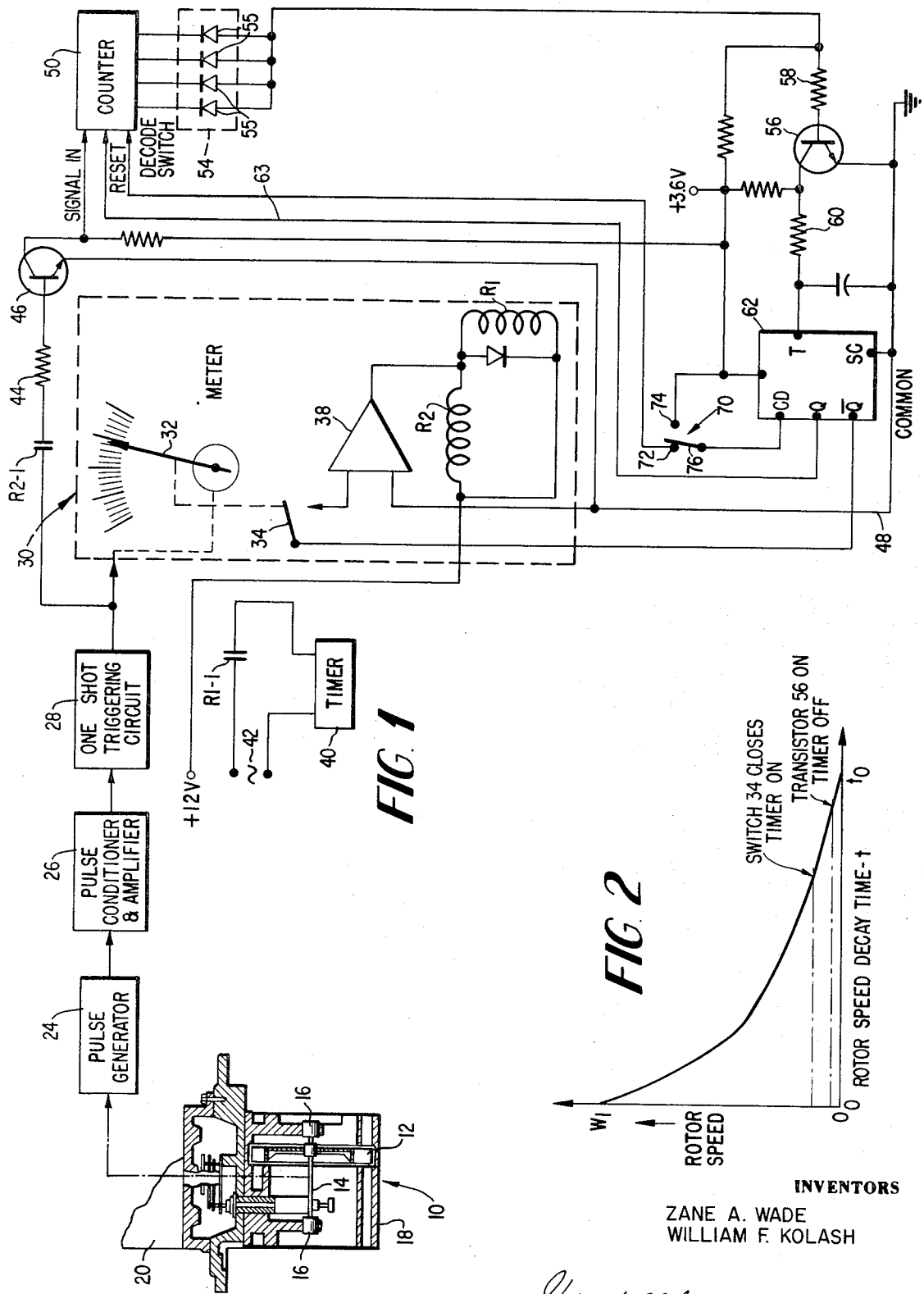

SPIN TESTING APPARATUS FOR TURBINE-TYPE FLOW METERS

FIELD OF INVENTION

This invention relates to apparatus for testing the accuracy of turbine type flow meters.

BACKGROUND

The turbine-type flow meter has been used for many years in the measurement of water. As a result of extensive research and development within recent years, the turbine type fluid flow meter has become of greater interest to other industries, such as petroleum, aerospace and gas. One of the reasons for this increased interest is the proven reliability of the turbine flow meter when it is correctly designed and properly applied. It also has a high degree of repeatability when the meter operates within its normal range and when it is in good physical condition.

It is generally accepted in the gas industry that the accuracy of gas turbine meters is established by calibration usually in the manufacturer's facility. Once a meter has been calibrated, it is important to have some method which can determine whether this accuracy is being maintained during its use in the field.

The best way for the meter user to check the meter accuracy is to have a calibration standard of his own. However, a calibration standard capable of calibrating a gas turbine meter with adequate accuracy (which may be a well instrumented orifice meter or critical flow orifices) is expensive, and not many gas turbine meter users can afford or justify having such calibration standards. For those users who do not have calibration standards, it is desirable to have some simple and practical means to determine whether the accuracy of the meter in its field use has definitely changed from its calibration to necessitate repair or reconditioning of the meter.

The accuracy of a turbine meter will be changed with a change of fluid friction (including effect due to velocity profile change) and change of nonfluid friction. For a gas turbine meter, such as the one shown in U.S. Pat. No. 3,304,780 issued to W. F. Z. Lee et al. on Feb. 21, 1967, the accuracy change is usually governed more by the change of mechanical friction than by the fluid friction, especially in low pressure gas measurement. A method of checking a gas turbine meter for possible change of meter accuracy is to: (a) visually inspect the meter for cleanliness and general conditions of vital parts, such as flow passages, rotor and bearings and (b) check the differential pressure across the entire meter when operating at high capacity to note any change from a corresponding reading when the meter was originally installed. Such tests, however, do not necessarily assure retention of meter accuracy at minimum or low flow rates which may occur due to an increase in mechanical friction.

SUMMARY & OBJECTS OF INVENTION

In comparison with the foregoing procedures for checking the meter accuracy, a major object of this invention is to provide for a novel apparatus and method which is simple, practical, and inexpensive, but yet accurately effective and reliable for checking the accuracy of a turbine type flow meter in the field or in other locations.

The apparatus of this invention provides measurements that can be compared with previously recorded data that is used as a reference or standard to determine if there has been a change in meter accuracy from calibration due to a change in mechanical friction. A number of factors may result in increased mechanical friction such as, for example, dirty bearings or misalignment of bearings. Mechanical friction is the principle factor affecting relatively low flow accuracy.

A change in mechanical friction is reflected by a rotor speed decay curve. A rotor speed decay curve constitutes a plot of the decaying speed of a coasting rotor against time. The rotor speed decay curve is plotted from data that is obtained by spin testing the turbine metering rotor. In such a spin test, the rotor is spun up to or above a predetermined speed and then allowed to coast to zero or some other lower speed.

Test data obtained from such spin tests reveal that for relatively low rotor speeds, the mechanical friction is essentially constant, only slightly increasing with speed. As a result, the rotor speed decay curve at such relatively low rotor speeds will essentially be linear. Therefore, the slope of this substantially linear portion of the decay curve is a factor that may be compared with a previously plotted or recorded spin test to determine if any change has occurred in the slope of the linear portion of the decay curve. An increase in the slope indicates increased mechanical friction and consequent impairment of meter accuracy.

The apparatus of this invention provides measurements that enable the foregoing comparison. In one embodiment of this invention the time for the speed of the coasting rotor to decay from a pre-set speed to a lower pre-set or predetermined speed is measured. Alternately, the time between the higher and lower rotor speeds may be made constant, and the change in rotor speed from its higher pre-set value may be measured. In both cases, the test data provides two plotting points on the rotor speed decay curve. Although this data only enables the plotting of a linear curve, additional data is made unnecessary by pre-setting the higher of the two rotor decay speeds in the relatively low rotor speed range where the actual rotor speed decay curve closely approaches a linear curve.

According to one embodiment of this invention, a pulse generator produces a pulse rate that is proportional to the decaying speed of the coasting turbine meter rotor. The pulse generator output is connected to a one-shot triggering circuit which makes the pulse width proportional to the input frequency. The output of the one-shot triggering circuit is applied to a meter where it is integrated to provide a meter movement that is indicative of the angular velocity of the rotor. When the meter reading decays to a pre-set speed, which is within the relatively low rotor speed range where the mechanical friction is essentially constant, the meter supplies an output signal for turning on a timer and for starting the count-in of the one-shot output pulses in a counter. Upon counting in a pre-selected number of pulses, a signal is supplied by the counter to turn off the timer.

Since the widths of the counted pulses are proporational to the rotor speed, the time to count in a pre-set or pre-selected number of such pulses will be the time required by the coasting rotor to decay to a predetermined speed. This time is then compared with a corresponding, previously recorded reference time value of a standardized spin test to determine if there has been a change, or more particularly an increase, in mechanical friction in the meter. Of course, other factors (such as slope calculated from the spin test data) may be utilized in making the comparison.

Thus, the apparatus of this invention automatically provides a read-out of a measured variable that may be compared with a previously recorded, corresponding, standard or reference value to determine if there has been an increase in mechanical friction.

With the foregoing in mind, another important object of this invention is to provide a novel apparatus which provides a read-out of a measured variable that may be compared with a corresponding, standardized or reference value to determine if the accuracy of the turbine meter has been impaired by an increase in mechanical friction.

Another object of this invention is to provide a novel, automatic turbine meter rotor spin tester.

Further objects of this invention will appear as the detailed description proceeds in connection with the below-described drawings and the appended claims.

DESCRIPTION OF DRAWINGS

FIG. 1 is a circuit diagram of an automatic turbine meter spin testing apparatus incorporating the principles of this invention;

FIG. 2 is an illustration of a typical rotor speed decay curve for a coasting turbine meter rotor;

DETAILED DESCRIPTION

Figure 3:
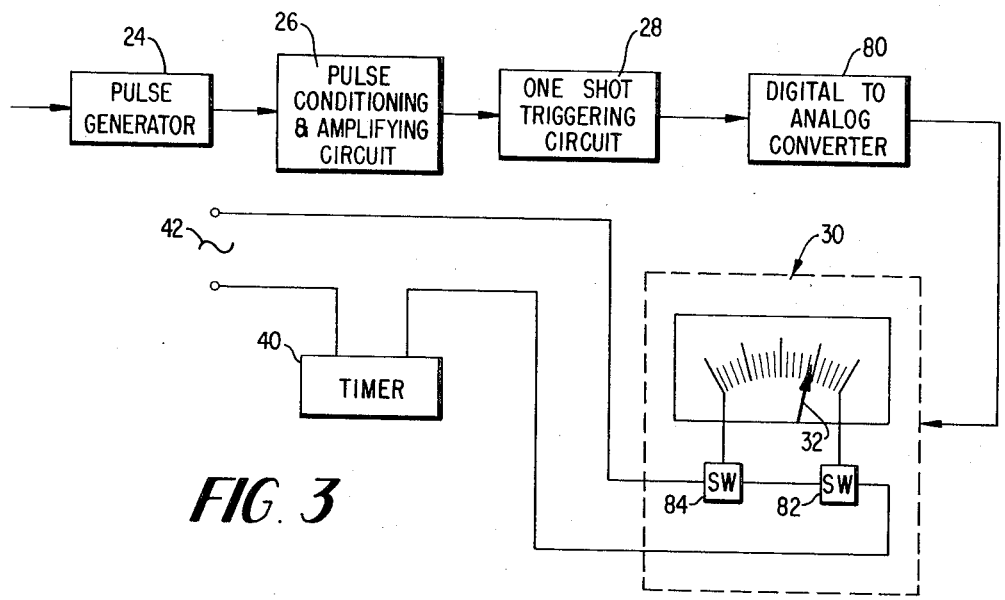
FIG. 3 is a schematic diagram of another embodiment of this invention.

Referring to FIG. 1 of the drawings, the turbine meter to be spin tested is indicated at 10 and is schematically shown to be of the axial flow type. Meter 10 may be constructed in the manner shown in Patent No. 3,304,780 and conventionally comprises a bladed turbine metering rotor or paddle wheel 12 which is coaxially mounted on a shaft 14. Shaft 14 is journaled by axially spaced apart bearings 16 in a core assembly 18. Core assembly 18 is adapted to be coaxially mounted in a tubular meter housing to define an annular fluid flow channel for directing the fluid through the blades of rotor 12. Shaft 14 is operatively connected by suitable motion transmitting means to a meter register 20.

The spin testing apparatus shown in FIG. 1 and incorporating the principles of this invention comprises a pulse generator 24 of suitable, conventional form. Generator 24, which is operatively associated with the assembly of rotor 12 and shaft 14, generates a train of pulses whose pulse repetition frequency is proportional to the angular velocity of rotor 12. Generator 24 may be of the type that is adapted to be connected to shaft 14.

The pulse output of generator 24 is applied to the input of a pulse conditioning and amplifying circuit 26. Circuit 26 may be of any suitable, conventional form for squaring off and amplifying the generator-supplied pulses.

The train of pulses supplied at the output of circuit 26 is applied to the input of a suitable one-shot triggering circuit 28. Circuit 28 may be of any suitable, conventional construction, such as a one shot multivibrator, for making the pulse width proportional to the frequency of the input signal. Thus, the output of circuit 28 is a train of serial pulses in which each pulse has a pulse width that is proportional to the frequency of the conditioned and amplified, generator-supplied pulse train at the time when each generator supplied pulse triggers circuit 28 to start its duty cycle.

The train of pulses supplied by circuit 28 is applied to an unshown integrating filter in an analog meter 30 for producing a meter hand movement. Since the pulse widths of the pulses supplied by circuit 28 are proportional to the pulse repetition frequency of the triggering pulses produced by generator 24, the movement of the meter indicator or hand, which is indicated at 32 in FIG. 1, will be proportional to the generator-produced repetition frequency and consequently to the angular velocity or RPM of rotor 12.

Meter 30 may be any suitable, conventional relay type having at least one normally open set point switch 34 and a pair of relays R1 and R2. One suitable meter is Model 29XA manufactured by Simpson Electric Co.

Actuation of switch 34 is under the control of the meter hand movement. When meter hand 32 moves in a direction of decreasing rotor speed to a selectively pre-set rotor speed, switch 34 will close to energize relays R1 and R2 through an amplifier 38. As shown, relays R1 and R2 are connected in parallel between the output of amplifier 38 and the positive terminal of a suitable d.c. power source.

Energization of relay R1 closes a set of normally open contacts R1-1 for turning on and thereby activating a timer 40 from a suitable a.c. power source indicated at 42. Timer 40 may be of any suitable, conventional construction such as the Model HSI 42 101M-10 timer manufactured by Haydon Switch and Instrument Co.

Still referring to FIG. 1, the output of circuit 28, in addition to being connected to the input terminals of meter 30, is also connected serially through a set of normally open contacts R2-1 of relay R2 and a isolating resistor 44 to the base of a transistor 46. Transistor 46 is in a common emitter configuration and has its emitter connected to a common 48 which, in turn, is connected to ground or other reference voltage level. The collector of transistor 46 is connected to the input of a multi-decade 1, 2, 4, 8 binary coded counter circuit 50.

When relay R2 is energized contacts R2-1 close to apply the output pulses of circuit 28 to the base of transistor 46. Each pulse turns transistor 46 on or renders it conductive, and when each pulse is removed, transistor 46 will be turned off or rendered non-conductive. As a result, corresponding pulses having pulses widths equal to that of the signal pulses applied to the transistor base will be applied to the input of counter circuit 50 where they are counted in a conventional manner.

Counter circuit 50 may be of any suitable, standard construction having four counters, latches or other bistable data bit storage devices in each decade for storing in each decade a four bit data word and, advantageously, the complement thereof. For example, each of the counter circuit storage devices may be a Motorola Model MC 790P in which the Q output pin of each storage device is connected to the input pin of the next succeeding storage device.

Counter circuit 50 therefore counts in the number of pulses applied to its input and provides a binary coded output that is equivalent to the decimal number of counted pulses. Since the pulse widths of the counted pulses are proportional to the pulse generator-produced pulse frequencies, from which they were converted in circuit 28, the number of counted pulses or more particularly the accumulated total of counted-in pulses in counter circuit 50 will, at any given instant during count-in, represent a specific, predetermined change in the angular velocity of rotor 12.

Depending upon the lower rotor speed at which it is desired to turn off timer 40 and to thereby terminate the test run, predetermined ones of the data storage device output pins in circuit 50 are connected in parallel to input pins of a decode switch 54. Switch 54 may be of any suitable, conventional form for decoding the input binary data information to control the bias condition at a transistor 56. For example, switch 54 may be a 1, 2, 4, 8 diode switch manufactured by ECCO under Model No. 205.

As shown, switch 54 comprises at least four diodes 55 connected in parallel between the input and output pins of the switch to provide an And circuit connection between the preselected output pins of counter circuit 50 and the base of transistor 56. As shown, the output pins of switch 54 are connected by a common line through a biasing resistor 58 to the base of transistor 56. The Q output pins and/or the $\overline{Q}$ output pin (providing complements of the data bits on corresponding Q output pins) of circuit 50 are pre-selected in such a manner that transistor 56 will be reverse biased until the pre-selected total of pulses, representing the preselected change in rotor speed at which timer 40 will be turned off, are accumulated in counter circuit 50.

When the pre-selected total of pulses are counted or accumulated in counter circuit 50, the logic or voltage level conditions supplied at the pre-selected output pins of circuit 50 and applied to the input pins of switch 54 will be such that diodes 55 will conduct to apply the needed voltage to the base of transistor 56 for forward biasing or turning on the transistor.

Still referring to FIG. 1, the emitter of transistor 56 is connected to common 48, and the collector of transistor 56 is connected through a resistor 60 to the triggering input pin of a suitable latch or other bistable data bit storage device 62.

Storage device 62 may be of any suitable, conventional type, such as a Motorola Model MC882G, and has a Q output and a $\overline{Q}$ output pin as shown. In this embodiment, the $\overline{Q}$ output pin of storage device 62 is connected to one terminal of the meter set point switch 34. The other terminal of switch 34 is connected to the input circuit of amplifier 38. The voltage level at the $\overline{Q}$ output pin of storage device 62 will be the complement of the voltage level at the Q output pin of device 62.

When transistor 56 is turned on or forward biased, it applies a triggering signal to storage device 62 to cause device 62 to memorize the triggering signal on its Q output pin and to place the complement of the memorized signal or zero volts on its $\overline{Q}$ output pin. The triggering signal in this embodiment is positive. When the transistor 56 is reverse biased or turned off to remove the triggering signal, the voltage conditions on the Q and $\overline{Q}$ output pins of storage device 62 are effectively reversed thus placing a positive voltage at the $\overline{Q}$ output pin and zero volts at the Q output pin.

From the foregoing it will be appreciated that until transistor is turned on, a positive voltage will be at the $\overline{Q}$ output pin of device 62, and when the meter set point switch 34 is closed by movement of the meter hand, this positive voltage is applied through amplifier 38 to energize relays R1 and R2. When transistor 56 is turned on, device 62 is triggered, and the voltage on the $\overline{Q}$ output pin of device goes to zero to de-energize relays R1 and R2 even though switch 34 remains closed.

To reset storage device 62 and counter circuit 50 in preparation for a test run a single pole double throw switch 70 is provided for and has a pair of terminals 72 and 74 and a movable switch element 76. Terminal 72 is connected to the unshown reset pin of each storage device in counter circuit 50. Terminal 74 is connected to the positive terminal of a d.c. power source, and this power source is also connected to the collector of transistor 56 and to the pre-set command pin of device 62. Switch element 76 is connected to the CD pre-set pin of storage device 62 and is biased to normally engage terminal 72. The Q output pin of device 62 is connected by a line 63 to the unshown CD pins of each storage device in counter circuit 50. With these circuit connections, selective actuation of switch element 76 to momentarily engage it with terminal 74 resets counter circuit 50 and pre-sets storage device 62. Upon release, switch element 76 will return to its illustrated position.

To spin test meter 10, the meter run is depressurized, the internal measurement mechanism comprising rotor 12, shaft 14, core assembly 18 and the rotor shaft bearings 16 is preferably removed from the meter housing, and generator 24 is operatively attached to rotor shaft 14. The meter internal mechanism comprising rotor 12 and the other parts mentioned above is advantageously placed in a controlled, draft-free environment, and a spin is selectively imparted to rotor 12 to start the test. Rotor 12 may be spun by hand or by a momentary blast of pressurized air from an air hose. The momentary application of spin-producing force applied to rotor 12 is sufficient to impart a maximum angular velocity to rotor 12 that exceeds the angular velocity that corresponds to the pre-selected set point setting of meter switch 34.

Upon removing the spin-producing force from rotor 12, rotor 12 is then allowed to coast so that its speed will decay. The rotor speed decay curve for the rotor-coasting period is shown in FIG. 2 and is a plot of rotor angular velocity ($\omega$) against rotor speed decay time ($t$). The portion of this rotor speed decay curve between zero rotor speed and a relatively low rotor speed (about 150 RPM for gas meters) is substantially linear for the previously explained reasons. Switch 34 is selectively pre-set to be actuated to its closed position at a rotor speed that lies on this substantially linear portion of the rotor speed decay curve and hence is within the upper and lower limits of this substantially linear portion. For example, switch 34 may set to be actuated by the meter hand movement when the rotor velocity decays to 150 RPM or some value somewhat less than 150 RPM.

While the rotor speed is decaying to the upper velocity limit of the timed coasting period, switch 34 will remain open. As a result, relays R1 and R2 will be de-energized. Timer 40 will consequently be turned off, and transistor 46 will be nonconductive to prevent the pulses supplied by circuit 28 from being applied to counter circuit 50. The pulses supplied by circuit 28 will, however, be applied to meter 30, thus resulting in the speed-decreasing movement of meter hand 32 toward the upper switch-actuating speed limit of the timed rotor coasting period. When this selectively, pre-set upper speed limit is reached by the meter hand, switch 34 closes to thereby complete a circuit between $\bar{Q}$ output pin of storage device 62 and the input circuit of amplifier 38. Since storage device 62 was pre-set by momentary actuation of switch 70 prior to starting the test run, a positive voltage level will be present at the $\bar{Q}$ output pin of storage device 62. Thus, when switch 34 closes relays R1 and R2 will be energized through amplifier 38 to respectively turn on timer 40 and transistor 46. Therefore, substantially concomitantly with turning on timer 40, the pulses supplied by circuit 28 will be applied to and counted in by counter circuit 50.

The speed of the coasting rotor continues to decay as shown by the curve in FIG. 2, and during this time, timer 40 is on, and the pulse count is accumulated in counter circuit 50. When the pre-selected total of pulses is accumulated in counter circuit 50, as determined by the selected counter output pins that are connected to switch 54, a signal voltage will be gated through switch 54 to turn on transistor 56.

The corresponding rotor speed at which the signal voltage is transmitted by switch 54 to render transistor 56 conductive is usually selected at some value that is greater than zero but significantly less than the upper speed limit of the timed rotor coasting period to ensure accurate results. Of course, the output pins of counter circuit 50 may alternatively be so selected that the transistor-turn-on signal voltage will not be gated through switch 54 until rotor 12 has stopped, but such a selection would unnessarily increase the time of the test run and require a relative large counter capacity.

As previously explained, the selection of counter output pins for connection to switch 54 will represent a predetermined change in the rotor speed, and such rotor speed change may be determined from the total number of pulses accumulated in counter circuit 50 at the time when the signal voltage is gated through switch 54 to render transistor 56 conductive.

By rendering transistor 56 conductive, a triggering signal voltage is applied to the input pin of storage device 62, causing device 62 to switch to its other bistable state. As a result, the voltage at the $\bar{Q}$ output pin of device 62 will go to zero, and relays R1 and R2 will consequently de-energize.

By de-energizing relay R2 contacts R2-1 open to disconnect counter circuit 50 from circuit 28. As a result, the pulses supplied by circuit 28 will no longer be applied to counter circuit 50 even though the rotor is still spinning and generator 24 is still generating pulses.

By de-energizing relay R1, contacts R1-1 open to turn off timer 40. The read-out on timer 40 now is the time that it took for the coasting rotor speed to decay from one pre-set speed to a lower pre-selected and pre-determined speed. This time value may then be compared with a corresponding reference time which may be supplied by the manufacturer and which is obtained from a standardized spin test of the meter being checked. If the time measured by timer 40 is greater than reference time, then mechanical friction has increased, and repair of reconditioning of the meter may be required.

It will be appreciated that with the data obtained from the foregoing test, a linear rotor speed decay curve may be plotted, and the slope of such a plotted curve may be compared with the slope of a reference rotor speed decay curve that was obtained from a standardized test to determine if there has been an increase in accuracy-impairing mechanical friction in the meter.

The automatic spin testing apparatus shown in FIG. 1 is relatively simple and inexpensive to manufacture and may be constructed as a portable unit that can easily be transported in the field.

In the embodiment shown in FIG. 3 the output of circuit 28 is connected to a digital-to-analog converter 80 of suitable, conventional form for converting the pulse input into an analog signal whose amplitude is proportional to the velocity of rotor 12. This analog signal is applied to meter 30. The type of meter described in connection with the embodiment of FIG. 1 usually is equipped with two set point switches as indicated at 82 and 84 in FIG. 3. Switch 82, which corresponds to switch 34 in FIG. 1, is normally open and is selectively pre-set to close when the meter hand moves down scale to the pre-selected upper speed limit of the timed rotor coasting period. Switch 84 is normally closed and is selectively pre-set to open when the rotor speed decays to a lower speed limit at which it is desired to turn off timer 40.

By closing switch 82 a circuit is completed through switch 84 to turn on timer 40. Switch 84 is selectively pre-set to open by the continuing down scale meter hand movement when the decaying rotor speed reaches a pre-selected angular velocity that is less than the angular velocity at which switch 82 was closed.

By opening switch 84 the energizing circuit for timer 40 is interrupted, and timer 40 is thereby turned off to provide a read-out of the time required by the rotor to coast from one pre-selected speed to a lower pre-selected speed.

The time read out by timer 40 may be compared with a corresponding reference time value as previously explained. In FIG. 3 the generator, the pulse conditioning circuit, the one-shot triggering circuit and timer are the same as that shown in FIG. 1. Accordingly like reference characters have been applied to designate like components.

In both of the embodiments just described, the upper and lower coasting rotor speed limits are pre-selected, and the time for the rotor speed to decay from the upper limit to the lower or terminal speed limit is read out as a measured variable. In the embodiment shown in FIG. 4, the time for the rotor speed to decay from one speed to a lower terminal speed is held constant, and the change in decaying rotor speed from a pre-selected upper limit is read out as a measured variable.

Figure 4:
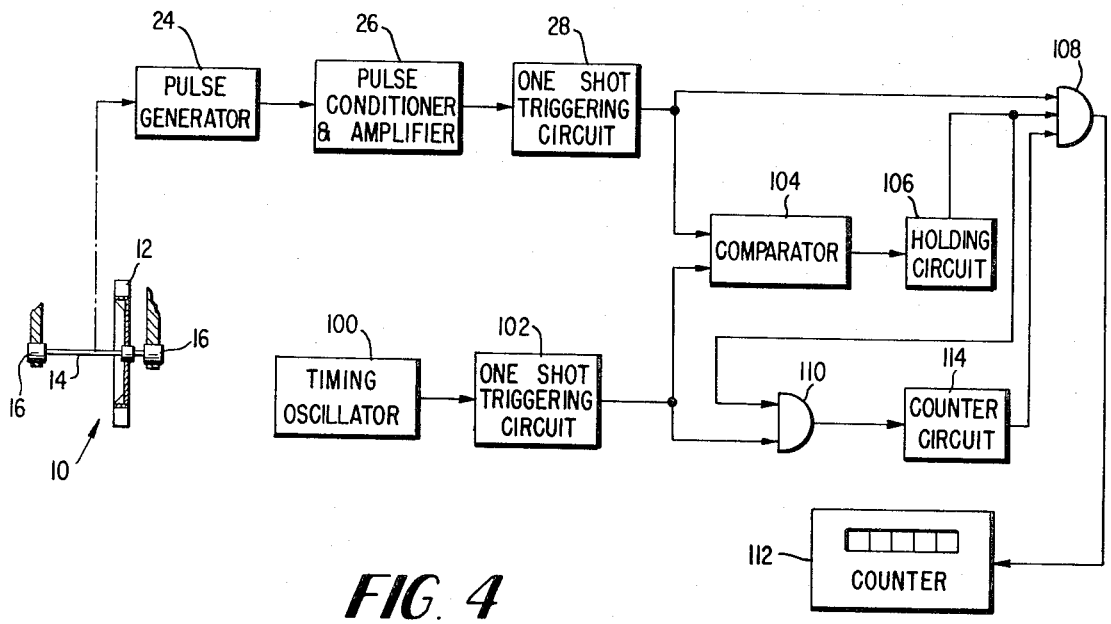
FIG. 4 is a schematic diagram of still another embodiment of this invention.

As shown in FIG. 4, pulse generator 24 is operatively connected to rotor shaft 14, circuit 26 is operatively connected to the output of generator 24, and circuit 28 is operatively connected to the output of circuit 26, all in the manner previously described. In this embodiment, however, a timing oscillator 100 has its output connected to the input of an additional one shot triggering circuit 102. Circuit 102 may be the same as circuit 28.

Timing oscillator 100 may be any suitable, conventional circuit that produces a pulse train of constant, pre-selected frequency. Thus, the pulses at the output of circuit 102 have a constant width proportional to frequency of their input triggering pulses from circuit 100, while the pulses supplied at the output of circuit 28 will have a variable width proportional to the frequency of the triggering, generator-produced pulses.

The pulses supplied by circuits 28 and 102 are applied to a suitable comparator 104 or other circuit that functions to produce a predetermined triggering signal when the pulse width of the signal supplied by circuit 28 matches that of the signal supplied by circuit 102. This predetermined triggering signal from circuit 104 is applied to a holding circuit 106 which may comprise a suitable bi-stable device. The triggering signal supplied by circuit 104 changes the state of the bi-stable device in circuit 106 as will be described in greater detail later on.

The output of circuit 106 is connected to the input side of an And gate 108 and also to the input side of another And gate 110. The output of circuit 28 is also connected to the input side of gate 108, and the output of circuit 102 is connected to the input side of gate 110 as shown. The output of gate 108 is connected to the input of a suitable pulse counter 112, and the output of gate 110 is connected to another counter circuit or timer 114. The output of counter circuit 114 is connected to the input side of gate 108 as shown.

The pulse repetition rate, or more particularly the frequency of the pulses generated by oscillator 100, is selected to correspond to and thus represent the upper rotor speed limit of the timed rotor coasting period. This upper speed limit is within the lower linear portion of the rotor speed decay curve as described in greater detail in connection with the embodiment of FIG. 1.

Counter circuit 114 may be of essentially the same construction as counter circuit 50. Since the pulses applied to and counted in by counter circuit 114 have a constant pulse repetition frequency, the accumulated pulse total in counter circuit 114 will be representative of and proportional to time. Thus, by selecting predetermined ones of the output pins of circuit 114 and by connecting the selected output pins through an unshown decode switch (such as switch 54) the counter output signal state will change upon the expiration of a pre-selected time to inhibit gate 108. The accumulated pulse total in counter 112 will therefore be representative of and proportional to a predetermined change in the rotor speed occurring over the fixed time period which is pre-set by counter circuit 114.

In spin testing a turbine meter rotor with the apparatus shown in FIG. 4, the internal mechanism comprising rotor 12, shaft 14 and the other parts are, as previously described, placed in a controlled, draft-free embodiment, and rotor 12 is accelerated momentarily to impart an angular velocity to rotor 12 that exceeds that angular velocity corresponding to the constant frequency of the pulses generated by oscillator 100. As previously explained rotor 12 may be accelerated by hand or with a momentary blast of pressurized air.

Upon removal of the spin-producing force, the rotor speed will decay, following a curve corresponding to that shown in FIG. 2. When the rotor speed decays to that magnitude where the pulse width of the pulse signal supplied by circuit 28 matches that supplied by circuit 102, circuit 104 produces a triggering signal which is applied to circuit 106 for changing the state of the bi-stable device in circuit 106. This change in state provides an enabling signal voltage which is applied to both gate 108 and gate 110.

By applying the enabling signal to gate 110, the pulses supplied at the output of circuit 102 are gated through gate 110 and applied to counter circuit 114 where they are counted in. Until the pre-selected total of pulses is accumulated in counter circuit 114, the output of circuit 114 provides an enabling signal voltage which is applied to gate 108.

Thus, when circuit 104 detects a matching condition between the pulse widths from circuits 28 and 102 to trigger the bi-stable device in circuit 106, the pulses from circuit 28 are gated to counter 112. The pulses therefore start accumulating in counter 112 when a matching condition occurs between the pulse widths from circuits 28 and 102.

The count-in of pulses at counter 112 will continue until the enabling signal, which is supplied by circuit 106, is removed from gate 108. This enabling signal will be removed when the accumulated pulse total in counter circuit 114 reaches the pre-selected amount. By this time a selectively pre-set time has expired, and upon the removal of the enabling signal, gate 108 will be inhibited to block the transfer of further pulses to counter 112. The accumulated total in counter 112 thus will represent the change in decaying rotor speed that occurred over the time period that was pre-set by counter circuit 114.

From the foregoing, it will be appreciated that the fixed time period, which was pre-set by circuit 114, is known that the decaying rotor speed at the beginning of the pre-set time period was pre-selected and is therefore known, and that decrease in rotor speed during the pre-set time period is available by the read-out on counter 112. From this data, therefore, the rotor speed at the end of the pre-set time period can be calculated, and with this information two plotting points are provided for plotting a linerized rotor speed decay curve. The slope of the thusly plotted decay curve can be compared with a corresponding reference value obtained from a standardized spin test as previously described. Alternatively, the manufacturer may provide a speed change reference value for direct comparison with the read-out on counter 112.

It will be appreciated that in the embodiments of FIGS. 1 and 3 the measured time of the rotor coasting period is a measure of the average mechanical friction of the rotating system of the meter, while in the embodiment of FIG. 4, the measured change in angular velocity of the coasting rotor is a measure of the average mechanical friction of the rotating meter system.

What is claimed and desired to be secured by Letters Patent is:

1. An apparatus for providing fluid flow turbine meter performance data in a fluid flow turbine meter spin test in which rotatable components forming a part of a fluid flow turbine meter and comprising a turbine meter rotor are accelerated and then allowed to coast, whereby the rate of decay of the rotational speed of the coasting rotor is dependent upon accuracy-impairing mechanical friction which resists rotation of the rotor, said apparatus comprising means for detecting the occurrence of different first and second preselected magnitudes of the rotational speed of the coasting rotor, said second pre-selected magnitude being less than said first pre-selected magnitude, and means responsive to the detection of said first and second pre-selected magnitudes of the rotor rotational speed for providing a predetermined parameter than can be compared with a reference parameter to determine if there has been a change in the mechanical friction developed by the operative meter parts under test subsequent to the determination of said reference parameter, said predetermined parameter being the time required by the coasting rotor to decelerate from said first pre-selected magnitude to said second pre-selected magnitude.

2. The apparatus defined in claim 1 wherein said means providing a measurement of said parameter comprises a timing device, and wherein said detecting means comprises signal producing means for producing a signal that represents the rotational speed of said rotor, and means controlled by said signal, said signal controlled means being effective (a) to activate said timing device when said signal corresponds to said first pre-selected magnitude and (b) to de-activate said timing device when said signal corresponds to said second pre-selected magnitude.

3. The apparatus defined in claim 1 wherein said means providing a measurement of said parameter comprises a timer, and wherein said detecting means comprises electrical signal-producing means adapted to be operatively associated with one of the rotatable components of said meter for producing an electrical signal that represents the rotational speed of said rotor, and means controlled by said signal, said signal controlled means being effective (a) to activate said timer when said signal corresponds to said first pre-selected magnitude and (b) to de-activate said timer when said signal corresponds to said second pre-selected magnitude.

4. The apparatus defined in claim 3 wherein said signal producing means comprises a pulse generator for generating electrical pulses with a frequency proportional to the rotational speed of said rotor.

5. The apparatus defined in claim 4 wherein said detecting means further comprises means for converting the pulses generated by said pulse generator into an analog output, and means controlled by said analog output for completing a circuit to activate said timer.

6. The apparatus defined in claim 4 wherein said detecting means further comprises a circuit having an input connected to receive the pulses generated by said pulse generator for producing a train of output pulses whose pulse widths are proportional to the frequency of the generator produced pulses, means for counting the number of pulses produced by said circuit and for producing a predetermined triggering signal upon the accumulation of a pre-selected number of counted-in pulses, and means responsive to said triggering signal for de-activating said timer by breaking the circuit that was established to activate said timer.

7. The apparatus defined in claim 1 wherein said first pre-selected magnitude of the rotor rotational speed is within that range of relatively low rotor rotational speeds in which the deceleration of the coasting rotor is substantially constant.

8. An apparatus for providing meter performance data in a fluid flow turbine meter spin test in which rotatable turbine meter components forming a part of a fluid flow turbine meter and comprising a turbine meter rotor are accelerated and then allowed to coast whereby the rate of decay of the rotational speed of the coasting rotor is dependent upon accuracy-impairing mechanical friction which resists rotation of the rotor, said apparatus comprising first means operative by activation and subsequent deactivation to produce an output that represents a predetermined, performance-indicating parameter which can be compared with a reference parameter to determine if there has been a change in the mechanical friction developed by the operative meter parts under test, second means effective upon the decay of the rotational speed of the coasting rotor to a pre-selected magnitude to activate said first means, and third means effective upon the expiration of a pre-selected time period following the decay of said coasting rotor speed to said pre-selected magnitude for deactivating said first means, said performance indicating parameter being the change that occurs in the rotational speed of the coasting rotor during said preselected time period.

9. The apparatus defined in claim 8 wherein said preselected magnitude of the decaying rotor speed is within that range of relatively low rotor rotational speeds in which deceleration of the rotor is substantially constant.

10. An apparatus for providing fluid flow turbine meter performance data in a fluid flow turbine meter spin test in which rotatable components forming a part of a fluid flow turbine meter and comprising a turbine meter rotor are accelerated and then allowed to coast, whereby the rate of decay of the rotational speed of the coasting rotor is dependent upon accuracy-impairing mechanical friction which resists rotation of said rotor, said apparatus comprising means for producing an electrical signal that represents the decaying speed of the coasting rotor, and means under the control of said signal for measuring the time required for the speed of the coasting rotor to decay from one pre-selected speed to a lower preselected speed.

11. The apparatus defined in claim 10 wherein said signal producing means comprises a pulse generator that is operatively associated with a rotatable component of said meter for generating pulses at a frequency proportional to the rotational speed of said rotor.

12. The apparatus defined in claim 11 wherein said means under the control of said signal comprises a timer, first means responsive to a generator produced pulse frequency corresponding to said one pre-selected speed for completing a circuit to activate said timer, and second means responsive to a generator produced pulse frequency corresponding to said lower preselected speed for de-activating said timer by breaking said circuit.

13. The apparatus defined in claim 11 wherein said means under the control of said signal comprises a counter for continuously counting the pulses supplied by said generator during the entire time interval between the occurrence of said one preselected speed and the occurrence of said lower pre-selected speed, said one pre-selected speed being within the range of relatively low rotor rotational speeds in which deceleration of said rotor is substantially constant.

14. An apparatus for providing meter performance data in a fluid flow turbine meter spin test in which rotatable turbine meter components forming a part of a fluid flow turbine meter and comprising a turbine meter rotor are accelerated and then allowed to coast whereby the rate of decay of the rotational speed of the coasting rotor is dependent upon accuracy-impairing mechanical friction which resists rotation of the rotor, said apparatus comprising first means for supplying a train of electrical pulses having a characteristic that is indicative of the rotational speed of the coasting rotor, a counter for counting said pulses, second means connected between said counter and said pulse supplying means for controlling the supply of said pulses to said counter, third means responsive to the decay of the rotational speed of the coasting rotor to a pre-selected value to condition said second means to supply said pulses to said counter, and fourth means responsive to the expiration of a preselected time after the rotational speed of the coasting rotor has decayed to said pre-selected value for conditioning said second means to block the supply of said pulses to said counter, said counter upon counting the pulses supplied to it during said pre-selected time providing an indication of the change in rotor rotational speed that occurred during said pre-selected time.

15. An apparatus for providing meter performance data in a fluid flow turbine meter spin test in which rotatable turbine meter components forming a part of a fluid flow turbine meter and comprising a turbine meter rotor are accelerated and then allowed to coast whereby the rate of decay of the rotational speed of the coasting rotor is dependent upon accuracy-impairing mechanical friction which resists rotation of the rotor, said apparatus comprising a timer operative by activation and subsequent deactivation to produce an output that represents a predetermined, performance-indicating parameter which can be compared with a reference parameter to determine if there has been a change in the mechanical friction developed by the operative meter parts under test, said performance-indicating parameter being the time required for the speed of the coasting rotor to decrease from a first pre-selected magnitude to a second pre-selected magnitude that is less than said first pre-selected magnitude, second means effective upon the decay of the rotational speed of the coasting rotor to said first pre-selected magnitude to activate said timer, and third means effective upon the decay of the rotor rotational speed to said second pre-selected magnitude to deactivate said timer, said first pre-selected magnitude of the decaying rotor speed being within that range of relative low rotor rotational speeds in which deceleration of the rotor is substantially constant.

16. An apparatus for providing fluid flow turbine meter performance data in a fluid flow turbine meter spin test in which rotatable components forming a part of a fluid flow turbine meter and comprising a turbine meter rotor are accelerated and then allowed to coast, whereby the rate of decay of the rotational speed of the coasting rotor is dependent upon accuracy-impairing mechanical friction which resists rotation of the rotor, said apparatus comprising means for detecting the occurrence of first and second pre-selected conditions, said first condition being a pre-selected magnitude of the rotational speed of the coasting rotor, and said second condition being the expiration of a pre-selected time period following the detection of said pre-selected magnitude of the rotor rotational speed, and means responsive to the detection of said first and second conditions for providing a measurement of a predetermined parameter than can be compared with a reference parameter to determine if there has been a change in the mechanical friction developed by the operative meter parts under test subsequent to the determination of said reference parameter, said predetermined parameter being the change in the rotational speed of the coasting rotor that occurs during said pre-selected time period.

17. The apparatus defined in claim 16 wherein said pre-selected magnitude of the rotor rotational speed is within that range of relatively low rotor rotational speeds in which the deceleration of the coasting rotor is substantially constant.

18. The apparatus defined in claim 16 wherein said means providing a measurement of said predetermined parameter comprises a counter means, and wherein said detecting means comprises a pulse generator adapted to be operatively associated with a rotatable component of said meter for generating electrical pulses at a frequency that is proportional to the rotational speed of said rotor, timing oscillator means for generating pulses at a pre-selected frequency that corresponds to said pre-selected magnitude, circuit means operatively connected to said generator and said oscillator and being effective to provide a predetermined signal when the frequency of pulses generated by said generator matches the frequency of the pulses produced by said oscillator means, a network forming a part of said circuit means and being operatively connected to said generator for producing output pulses whose widths are proportional to the frequency of the generator-produced pulses, a timer, means responsive to said predetermined signal for enabling the pulses supplied by said network to be applied to said counter means and for activating said timer means, said timer means being effective upon a pre-selected time after it is activated to supply another signal that inhibits the transmission of the network-supplied pulses to said counter means.

19. An apparatus for providing meter performance data in a fluid flow turbine meter spin test in which rotatable turbine meter components forming a part of a fluid flow turbine meter and comprising a turbine meter rotor are accelerated and then allowed to coast whereby the rate of decay of the rotational speed of the coasting rotor is dependent upon accuracy-impairing mechanical friction which resists rotation of the rotor, said apparatus comprising first means operative by activation and subsequent deactivation to produce an output that represents a predetermined, performance-indicating parameter which can be compared with a reference parameter to determine if there has been a change in the mechanical friction developed by the operative meter parts under test, second means effective upon the decay of the rotational speed of the coasting rotor to a first pre-selected magnitude to activate said first means, and third means effective upon the decay of said coasting rotor speed to a second pre-selected magnitude that is less than said first pre-selected magnitude for deactivating said first means, said output of said first means being indicative of the time required for the speed of the coasting rotor to decay from said first pre-selected magnitude to said second pre-selected magnitude.

20. The apparatus defined in claim 19 wherein said first pre-selected magnitude of the decaying rotor speed is within that range of relatively low rotor rotational speeds in which deceleration of the rotor is substantially constant.

21. An apparatus for providing meter performance data in a fluid flow turbine meter spin test in which rotatable turbine meter components forming a part of a fluid flow turbine meter and comprising a turbine meter rotor are accelerated and then allowed to coast whereby the rate of decay of the rotational speed of the coasting rotor is dependent upon accuracy-impairing mechanical friction which resists rotation of the rotor, said apparatus comprising means for detecting the occurrence of a pre-selected magnitude of the decaying rotational speed of the coasting rotor, and means rendered effective by the detection of said pre-selected magnitude by said detecting means to indicate the change that occurs in the decaying rotor rotational speed in a preselected time period following the detection of said pre-selected magnitude to provide a measurement which is capable of comparison with a reference parameter for determining if there has been a change in the mechanical friction that is developed by the operative meter parts under test.

* * * * *